United States Patent
Joos et al.

(10) Patent No.: US 8,167,066 B2
(45) Date of Patent: May 1, 2012

(54) DEFINED INTERNAL COMBUSTION ENGINE OPERATION IN VEHICLES HAVING A HYBRID DRIVE

(75) Inventors: Klaus Joos, Walheim (DE); Kersten Wehmeier, Ludwigsburg (DE); Martin Streib, Vaihingen (DE); Thomas Huber, Daisbach (DE); Eberhard Schnaibel, Hemmingen (DE); Bernd Kesch, Hemmingen (DE); Rene Schenk, Tamm (DE); Stefan Tumback, Stuttgart (DE); Peter Baeuerle, Ludwigsburg (DE); Karsten Mann, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 761 days.

(21) Appl. No.: 12/296,349

(22) PCT Filed: Mar. 22, 2007

(86) PCT No.: PCT/EP2007/052718
§ 371 (c)(1),
(2), (4) Date: Jan. 26, 2009

(87) PCT Pub. No.: WO2007/115917
PCT Pub. Date: Oct. 18, 2007

(65) Prior Publication Data
US 2009/0173557 A1    Jul. 9, 2009

(30) Foreign Application Priority Data
Apr. 10, 2006   (DE) .......................... 10 2006 016 810

(51) Int. Cl.
    *B60W 10/06* (2006.01)
(52) U.S. Cl. ................. 180/65.265; 180/65.28
(58) Field of Classification Search ............... 180/65.28, 180/65.265, 65.285, 65.25
See application file for complete search history.

(56) References Cited

U.S. PATENT DOCUMENTS

| | | | | |
|---|---|---|---|---|
| 5,789,882 | A * | 8/1998 | Ibaraki et al. | 318/148 |
| 5,806,617 | A * | 9/1998 | Yamaguchi | 180/65.235 |
| 5,841,201 | A * | 11/1998 | Tabata et al. | 290/40 C |
| 6,077,186 | A * | 6/2000 | Kojima et al. | 477/3 |
| 6,176,807 | B1 * | 1/2001 | Oba et al. | 477/5 |
| 6,675,078 | B2 | 1/2004 | Bitzer et al. | |
| 6,962,550 | B2 * | 11/2005 | Kadota | 477/15 |
| 7,168,515 | B2 * | 1/2007 | Ito et al. | 180/65.23 |

(Continued)

FOREIGN PATENT DOCUMENTS
DE       10046986       4/2002
(Continued)

OTHER PUBLICATIONS

International Search Report, PCT International Patent Application No. PCT/EP2007/052718, dated Jul. 5, 2007.

*Primary Examiner* — Jeffrey J Restifo
(74) *Attorney, Agent, or Firm* — Kenyon & Kenyon LLP

(57) ABSTRACT

A method for setting operating states of an internal combustion engine, in particular an internal combustion engine of a hybrid drive. In addition to the internal combustion engine, the hybrid drive includes at least one electric drive, a hybrid coordinator and a control unit assigned to the internal combustion engine in which functions are implemented. The functions request operating states favorable to their running ability from the hybrid coordinator which performs a commensurate modification of the distribution of power between the internal combustion engine and the at least one electric drive.

6 Claims, 4 Drawing Sheets

U.S. PATENT DOCUMENTS

| | | | |
|---|---|---|---|
| 7,207,404 B2 * | 4/2007 | Ito et al. | 180/65.28 |
| 7,219,756 B2 | 5/2007 | Bischoff | |
| 7,220,212 B2 * | 5/2007 | Endo | 477/3 |
| 7,268,442 B2 * | 9/2007 | Syed et al. | 290/40 C |
| 7,285,869 B2 * | 10/2007 | Syed et al. | 290/40 C |
| 7,434,641 B2 * | 10/2008 | Takami et al. | 180/65.25 |
| 7,520,353 B2 * | 4/2009 | Severinsky et al. | 180/65.28 |
| 7,617,893 B2 * | 11/2009 | Syed et al. | 180/65.21 |
| 7,673,714 B2 * | 3/2010 | Soliman et al. | 180/65.265 |
| 7,734,401 B2 * | 6/2010 | Joe et al. | 701/54 |
| 7,762,922 B2 * | 7/2010 | Dreibholz et al. | 477/5 |
| 2007/0266711 A1 | 11/2007 | Falkenstein et al. | |
| 2011/0130901 A1 * | 6/2011 | Mori et al. | 701/22 |

FOREIGN PATENT DOCUMENTS

| | | |
|---|---|---|
| DE | 1020040445507 | 3/2006 |
| EP | 0965475 | 12/1999 |
| EP | 1472108 | 3/2006 |
| JP | 8294205 | 11/1996 |
| JP | 2002176705 | 6/2002 |
| JP | 2005-269705 | 9/2005 |

* cited by examiner

DEFINED INTERNAL COMBUSTION ENGINE OPERATION IN VEHICLES HAVING A HYBRID DRIVE

BACKGROUND INFORMATION

Various functionalities within a controller for internal combustion engines, such as diagnoses or adaptations, require defined operating states of the internal combustion engine, such as idling, or specific load/rotational speed profiles, in order to be able to run. If such operating states do not occur during a driving cycle, the functions are also unable to run.

A method for operating a vehicle drive and a device for implementing the method are described in German Patent Application No. DE 10 2004 0445 507, filed on Sep. 15, 2004. A method for operating a vehicle drive is described, the vehicle drive having at least one internal combustion engine and at least one electric machine mechanically coupled to the at least one internal combustion engine as well as an energy accumulator actively connected to the electric machine and/or the internal combustion engine. The at least one internal combustion engine and the at least one electric machine generate a requested setpoint drive torque Msetpoint generally jointly. A requested optimal setpoint torque $M_v$, $M_{VM\ setpoint\ opt}$ of the internal combustion engine is limited to an optimized minimum torque $M_{VM\ min\ opt}$ above a minimum torque $M_{VM\ min}$ of the internal combustion engine and/or an optimized maximum torque $M_{VM\ max\ opt}$ below a maximum torque $M_{VM\ max}$ of the internal combustion engine. A rate of change of optimal setpoint torque $M_{VM\ opt}$ of the internal combustion engine is limited.

In vehicles having a hybrid drive, one objective is to operate the internal combustion engine in the range of favorable efficiencies, to switch the internal combustion engine off when the vehicle is at a standstill or at low vehicle speeds and drive it electrically as well as to utilize braking energy through recuperation. In parallel hybrids, the torques of the internal combustion engine and the torques of one or a plurality of electric drives are added to a drive train torque. The electric drives may be connected, for example as starter generators to the belt drive or the crankshaft of the internal combustion engine. In modern internal combustion engines, various operating points may be problematic with regard to exhaust emissions and fuel consumption. In spark-ignited internal combustion engines, high torques may, for example require a departure from the stoichiometric air-fuel mixture; a full-power mixture enrichment may also be necessary to keep component temperatures within allowed limits. In order to set very low torques, it is customary to displace the ignition angle on the internal combustion engine in the retarded direction, which is also used to achieve derivative-action torque, in order, for example, to build up torque faster from idling. However, the ignition angle displacement brings reduced efficiency. In connection with overrun fuel cutoffs, increased nitrogen oxide emissions may arise due to surplus oxygen in the catalytic converter. Also, the operation of self-igniting internal combustion engines at high torques is expected to result in increased blackening rates and nitrogen oxide emissions; in contrast, operation of self-igniting internal combustion engines at low torques brings the risk that the catalytic converter will cool down.

SUMMARY

An object of the present invention is to set defined operating states of the internal combustion engine in a vehicle having a hybrid drive in a targeted manner, a requested drive train torque and a vehicle speed being simultaneously retained.

According to the present invention, this object may be achieved in that the engine controller or the engine control unit of the internal combustion engine no longer waits for an occurrence of specific operating states of the internal combustion engine in order to allow specific functions to run such as, for example, diagnoses or adaptations, but instead it actively requests operating states, making it possible for specific functions to run. This procedure makes it possible, for example, to accelerate the running of diagnostic procedures or adaptation operations and in particular to avoid the interruption of an ongoing diagnostic procedure. To that end, functions of the engine controller or the engine control unit request advantageous operating conditions for the internal combustion engine which are set on the internal combustion engine and the at least one electric drive of a hybrid drive through suitable activations so that despite the running of the functions, a requested vehicle speed is maintained and a requested drive train torque is generated on the drive train of the vehicle having a hybrid drive, preferably a parallel hybrid drive.

In general, a drive train, in particular that of a parallel hybrid drive of a vehicle, includes an internal combustion engine and at least one electric drive as well as a transmission and clutch. A separate control unit may be assigned to the internal combustion engine as well as to the electric machine and the transmission. Furthermore, a hybrid controller, for example a hybrid coordinator, is provided and coordinates the internal combustion engine, the at least one electric drive and the vehicle transmission. The engine controller or the engine control unit requests defined operating conditions for the internal combustion engine which are set by the hybrid coordinator by suitable activation of the at least one electric drive and the vehicle transmission in such a way that the requested drive train torque M_out is applied at a requested drive train rotational speed n_out. The requested drive train torque M_out or the requested drive train rotational speed n_out are set as a function of the speed of the vehicle, the tire diameter and the differential ratio.

At a torque specified for the internal combustion engine, the hybrid coordinator may, for example, specify a torque for the at least one electric drive in such a way that a requested drive train torque M_out is applied. For setting the rotational speed of the internal combustion engine, the transmission controller, in an automatic transmission, for example, may change the currently selected gear step or the currently selected gear. At a constant vehicle speed, this results in a different rotational speed of the internal combustion engine, which is possibly closer to the default setting for its rotational speed.

In view of the outlined technical problem, with respect to the possibility of running functions for diagnosis or for adaptation, information is necessary as to whether functions in question could run independently of a just randomly set operating point or a randomly set distribution of power. In order to activate the particular function, information is necessary as to whether an operating point suitable for running the function could be achieved by another distribution of power within the hybrid controller. Thus, all of the functions coming into question have the possibility of determining if a run is appropriate. Those diagnosis or adaptation functions which could run are able to signal their particular operating readiness to an operating state coordinator or a scheduler or request a release for the run.

In a first embodiment variant, the hybrid coordinator constantly sends the operating range possible at a given time. Each function checks whether its requests are compatible with this possible operating range. Both the function and a scheduler for each function are able to perform this check. From the compatible functions, the scheduler then selects the one having the highest priority. This selected function sends the specific operating point request to the hybrid coordinator. The hybrid coordinator then changes the settings in such a way that the selected operating point of the internal combustion engine is reached within the hybrid drive. If the driving state changes, triggered for example by a driver request, in such a way that it is no longer possible to reach the requested operating point, the possible operating range is adjusted accordingly and the function in question stops its activities, if necessary.

In another embodiment variant, the scheduler is able to determine the function having the highest priority. Using the possible operating points at which this function is able to run, the scheduler queries the hybrid coordinator whether this is possible. If the hybrid coordinator accepts this, the function is started and the corresponding operating point request of the function having the highest priority is activated. However, if the hybrid coordinator does not accept this, the scheduler may repeat its query with the operating parameters of another function.

The advantage of these embodiment variants is that it is only necessary to expand the existing infrastructure on the internal combustion engine to an insignificant degree. Furthermore, the necessary interface(s) is or are for the most part generic. The interfaces are not tailored to special diagnosis or adaptation functions but instead may be used for a large number of functions. This eliminates the necessity of having a large number of interfaces available, which would be accompanied by additional implementation and wiring complexity.

BRIEF DESCRIPTION OF THE DRAWINGS

The present invention is explained in greater detail below with reference to the figures.

DETAILED DESCRIPTION OF EXAMPLE EMBODIMENTS

Figure 1:
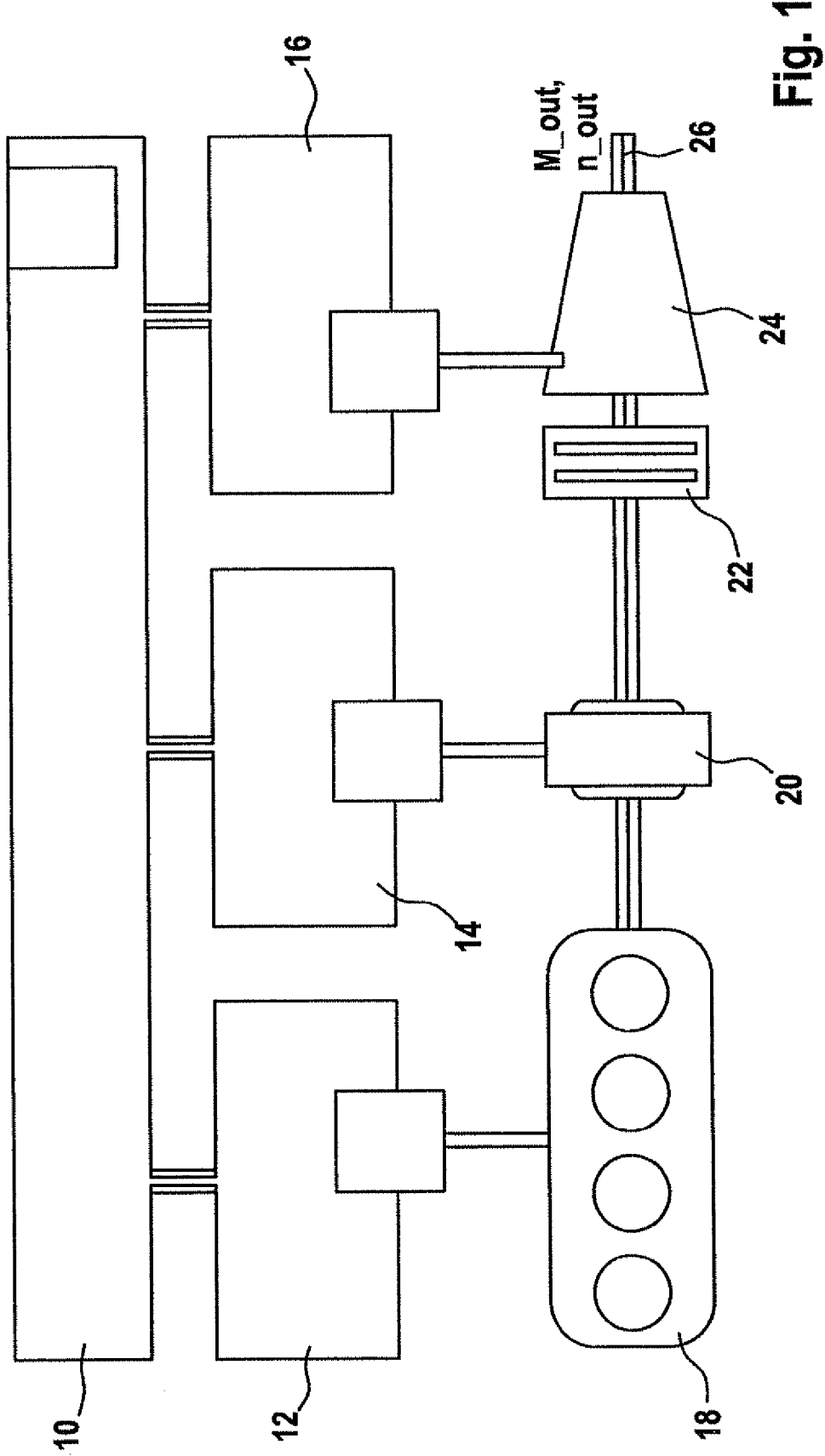
FIG. 1 shows the components of a drive train of a parallel hybrid drive of a vehicle.

FIG. 1 shows the components of a hybrid drive, in particular a parallel hybrid drive of a vehicle.

A hybrid coordinator 10 has a connection with a control unit 12 for an internal combustion engine 18 as well as a connection with a control unit 14 for at least one electric drive 20 as well as another control unit 16 for a vehicle transmission 24. In the drawing shown in FIG. 1, an internal combustion engine 18 is rigidly coupled to at least one electric drive 20. A clutch 22 which is indicated only schematically here is located between the at least one electric drive 20 and vehicle transmission 24. A clutch may also be situated between internal combustion engine 18 and the at least one electric drive 20. A drive shaft 26 extends on the power take-off side of vehicle transmission 24 and transitions into a drive train of a vehicle having a hybrid drive, which is not shown in greater detail here. On the output side on vehicle transmission 24, a transmission output torque M_out and a transmission output rotational speed n_out are present.

Figure 2:
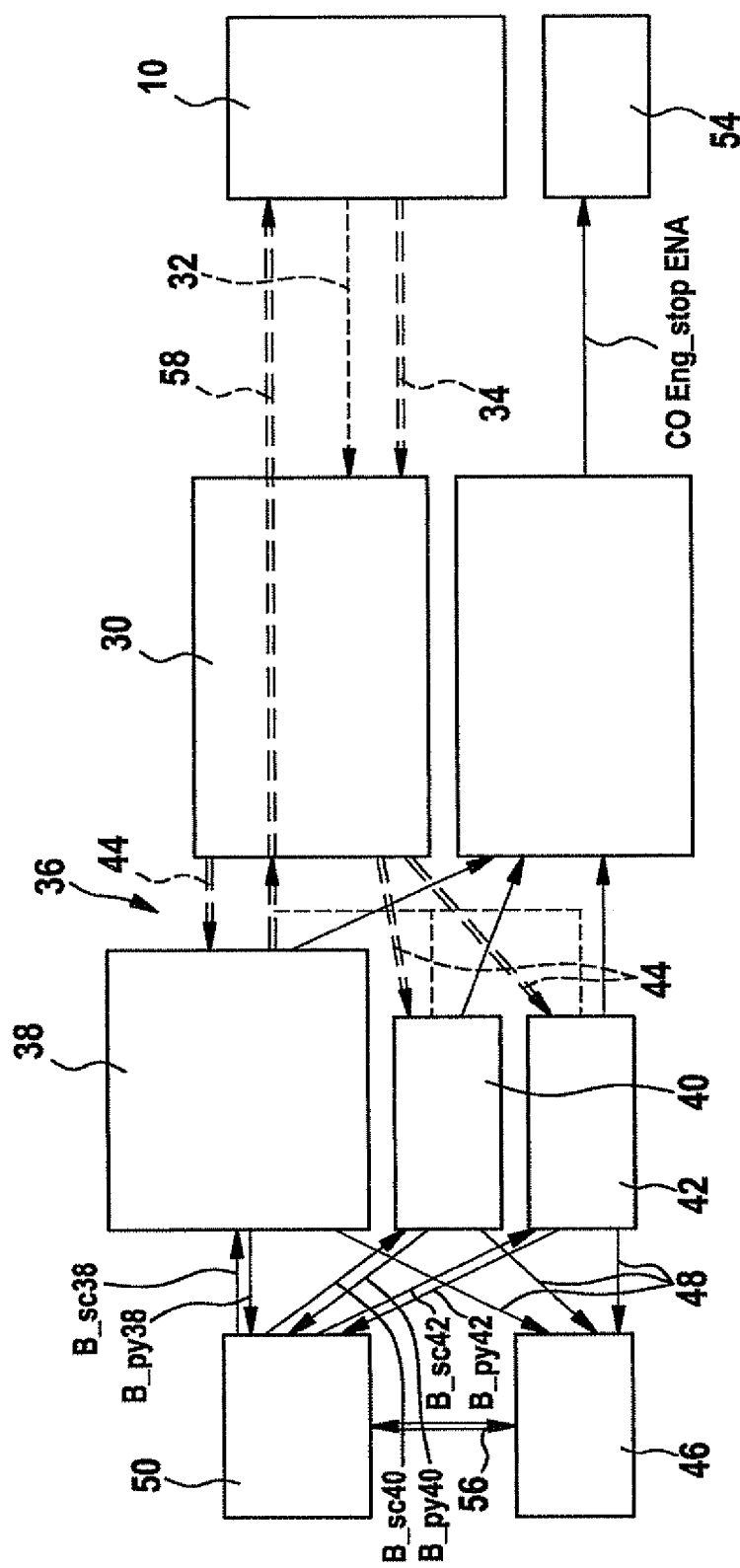
FIG. 2 shows a first embodiment variant of a hybrid coordinator for querying possible operating states to be started referring to the internal combustion engine of the hybrid drive.

FIG. 2 shows a first example embodiment variant of a hybrid coordinator which is in connection with a coordinator 30 for internal combustion engine 18. A hybrid coordinator 10 supplies possible operating states 34 to coordinator 30 of internal combustion engine 18. Coordinator 30 provides the information concerning possible operating states 34 via processed possible operating states 44 of a first function 38 or a first function block 38, an additional second function 40 and a third function 42. Instead of the three functions 38, 40 and 42 shown in FIG. 1, a large number of additional functions, which are not shown in detail here, would also be possible. Furthermore, hybrid coordinator 10 sends a torque request 32 to coordinator 30 of internal combustion engine 18.

Based on processed operating states 44 reported by coordinator 30, each of functions 38, 40, 42 determines the physical operating readiness and reports it to a scheduler 50 via a flag B_sc 38, B_py 38 in the case of first function 38. If functions or function blocks 38, 40, 42 have a direct access 48 to an operating state coordinator 46, functions 38, 40, 42 may also activate their particular request in it.

Based on the information received via flags B_sc 38 in the case of first function 38, B_sc 40 in the case of second function 40 and B_sc 42 in the case of third function 42, scheduler 50 (DSM) selects a function and informs the particular function selected from functions 38, 40, 42 of the selection made by setting a flag B_sc 38, B_sc 40 or B_sc 42, each specific to a function. The function selected from functions 38, 40, 42 sends the actual request to hybrid coordinator 10 via coordinator 30. Hybrid coordinator 10 for its part then properly sets the torque distribution between internal combustion engine 18 and the at least one electric drive 20 and changes torque request 32 directed to internal combustion engine 18 according to the torque distribution.

If hybrid coordinator 10 is unable to provide the desired operating state or is no longer able to do so, which may occur due to a driver request, possible operating states 34 are adjusted. A start/stop release may use simple function identifier FID_start or FID_stop, each of which is mutually exclusive. They are based on the decision within a start and stop release.

Different variations are possible as interfaces for the possible operating points. For example, they may be selected based on the maximum or minimum possible torque as well as a maximum and minimum possible rotational speed. It is possible, for example, to form a plurality of rotational speed/torque pairs which span an engine map surface. As an alternative to the discussed torques, the maximum and the minimum power of internal combustion engine 18 may be entered in the operating points to be selected.

Since a momentary supply of torque is not adequate for many functions, it is also possible to provide information concerning how long this torque could be maintained at current boundary conditions. As an alternative, the maximum duration for the particular operating range may be provided as key data. An entirely reasonable expansion would be to inform scheduler 50 of the associated priority in addition to the requested operating point. The priority information may be used in hybrid coordinator 10 to classify the urgency of the request and also to reject it. In the case of requested operating states 58 which are sent to hybrid coordinator 10, limited operating ranges may also be selected instead of only discrete operating points, which allows hybrid coordinator 10 greater decision-making latitude.

Reference numeral 54 denotes a start/stop coordinator in the representation according to FIG. 2. Scheduler 50 and operating state coordinator 46 are connected via a bidirectional data exchange 56, it also being possible to activate operating state coordinator 46 if necessary via direct accesses 48 of particular functions 38, 40 and 42.

Figure 3:
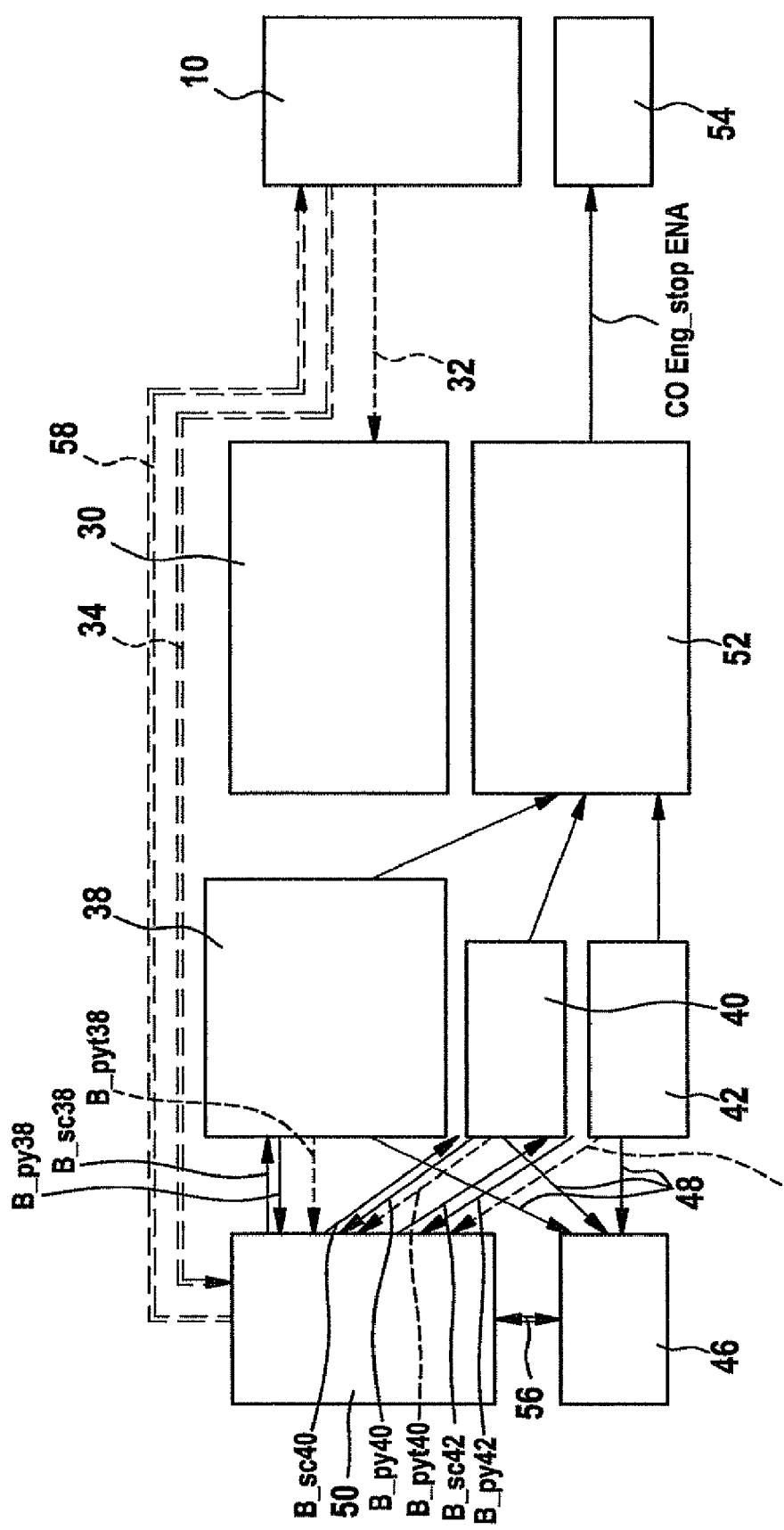
FIG. 3 shows an embodiment variant of the representation according to FIG. 2, an exchange with respect to possible and requested operating states occurring directly between the hybrid coordinator and a scheduler.

FIG. 3 shows an alternative embodiment variant of the functionality of a hybrid coordinator shown in FIG. 2.

As depicted in FIG. 3, hybrid coordinator 10 sends torque request 32 to coordinator 30 of internal combustion engine 18. Both hybrid coordinator 10 and coordinator 30 of internal combustion engine 18 may be contained in control unit 12 of internal combustion engine 18. According to the embodiment variant of a hybrid drive controller shown in FIG. 3, hybrid coordinator 10 communicates directly with scheduler 50. Hybrid coordinator 10 sends possible operating points with respect to possible operating states 34 directly to scheduler 50, which, for its part, sends requested operating states 58 directly to hybrid coordinator 10 and is in bidirectional data exchange 56 with operating state coordinator 46. In contrast to the embodiment variant shown in FIG. 2, each of functions 38, 40 and 42 sends its run request to scheduler 50 via a corresponding flag B_pyt 38, B_pyt 40 or B_pyt 42 if the operating point matches. Scheduler 50 contains information concerning the possible operating points of internal combustion engine 18 sent by hybrid coordinator 10. Scheduler 50 selects from the three functions 38, 40 and 42 named here as an example the one having the highest priority which is compatible with possible operating states 34 sent by hybrid coordinator 10.

As an alternative to this procedure, it is also possible for each of functions 38, 40 and 42 assigned to scheduler 50 (DSM) to send their possible operating points directly to scheduler 50.

For the selected function, i.e., for which an operating point is present on which the particular function 38, 40 or 42 is able to be run and has the highest priority, scheduler 50 requests an operating state per request 58 from hybrid coordinator 10. If hybrid coordinator 10 approves the request, the release will be sent to the function selected from functions 38, 40 and 42 by scheduler 50 via a flag B_sc 38, B_sc 40 or B_sc 42. Furthermore, according to the example embodiment variant shown in FIG. 3, the physical operating readiness is sent to scheduler 50 via flags B_py 38, B_py 40 and B_py 42 by the functions or function blocks 38, 40, 42.

According to the example embodiment variant shown in FIG. 3, similar to the embodiment variant according to FIG. 2, the functions or function blocks 38, 40 and 42 also have direct accesses 48 to operating state coordinator 46.

Furthermore, each of the functions or function blocks 38, 40 and 42 is in connection with stop release 52 via which, if necessary, a start or stop signal is sent to start/stop coordinator 54, if necessary via a signal CO Eng_stop.ENA. Via stop release 52, start/stop coordinator 54 and signal CO_stop, a control signal is given within a power split hybrid drive as to when internal combustion engine 18, for example, may be completely shut down.

In the example embodiment variant of the controller of a hybrid drive shown in FIG. 3, the priority of the sequence of functions 38, 40 and 42 is taken into account. Thus, according to the embodiment variant shown in FIG. 3, information regarding the urgency of the run of functions 38, 40 and 42 is sent to superordinate hybrid coordinator 10, which in the case of the hybrid controller according to FIG. 2 is not yet taken into account.

Figure 4:
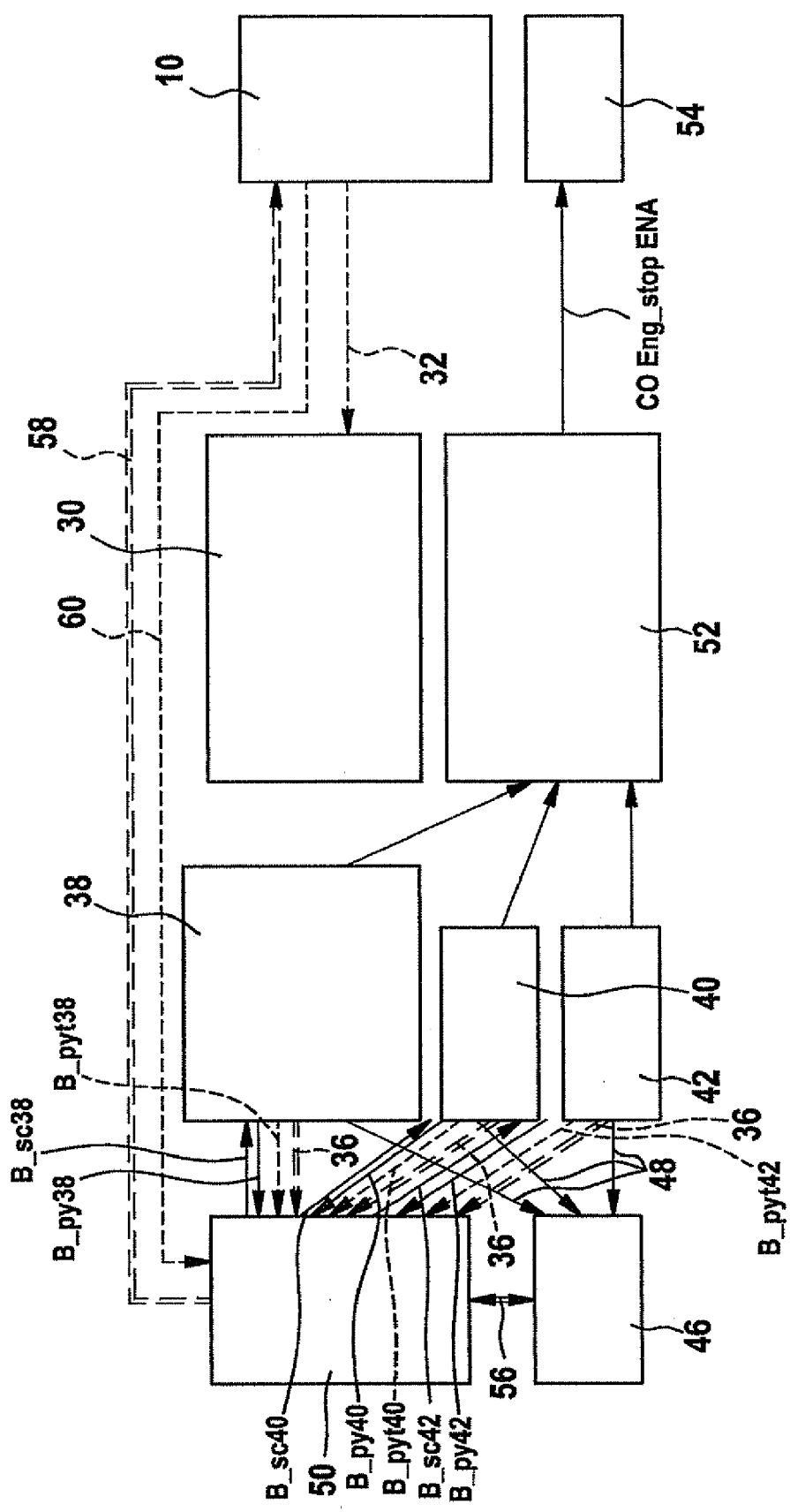
FIG. 4 shows another embodiment variant of the hybrid coordinator shown in FIG. 3 having direct addressing of the scheduler and direct data exchange between the functions.

While in the embodiment variant according to FIG. 2, processed possible operating states 36 are reported by coordinator 30 to functions 38, 40 and 42 via a feedback 44, it is possible in another example embodiment variant shown in connection with FIG. 4 that individual functions 38, 40 and 42 send processed possible operating states 36 directly to scheduler 50 (DSM).

FIG. 4 shows an embodiment variant that, in contrast to the embodiment variant shown in FIG. 1, sends processed possible operating states to the scheduler through the functions themselves.

In the example embodiment variant shown in FIG. 4, torque request 32 also goes from hybrid coordinator 10 to coordinator 30 of internal combustion engine 18. Via hybrid coordinator 10, consent signals 60 are sent to scheduler 50, from which hybrid coordinator 10 in turn receives information concerning requested operating states 58.

In the example embodiment variant shown in FIG. 4, three functions 38, 40 and 42 used as an example here send information regarding their physical operating readiness to scheduler 50 (DSM) via already mentioned flags B_py 38, B_py 40 and B_py 42. Also, in the example embodiment variant shown in FIG. 4, the functions or function blocks 38, 40 and 42 send processed possible operating states 36 directly to scheduler 50. Furthermore, in the example embodiment variant of a hybrid drive controller shown in FIG. 4, flags B_pyt 38, B_pyt 40 and B_pyt 42 are sent directly to scheduler 50 (DSM) to indicate a run request at a given operating point. Scheduler 50 (DSM) selects function 38, 40 or 42 having the highest priority and requests requested operating state 48 from hybrid coordinator 10. Since no information concerning a possible operating point is present in the example embodiment variant according to FIG. 4, hybrid coordinator 10 reports back to scheduler 50 (DSM) via consent 60 if the requested operating point is possible. If this is not possible, scheduler 50 (DSM) discards its decision and selects another function from functions 38, 40 and 42, for which a query is again carried out at hybrid coordinator 10. As an alternative, information as to which possible operating points match a specific function 38, 40 or 42 could also be stored in scheduler 50 (DSM).

The advantage of the example embodiment variant according to FIG. 4 is that it is not necessary for hybrid coordinator 10 to calculate general ranges with respect to possible operating points. A decision within hybrid coordinator 10 is made based on a specific operating point which is sent to it by scheduler 50 via requested operating states 58 for a specific function already selected. Accordingly, hybrid coordinator 10 only decides if a consent 60 is possible in view of the vehicle's driving state. It may be appropriate to perform a plurality of attempts until a function running compatibly with internal combustion engine 18 at the given operating states is determined from functions 38, 40 and 42.

In the example embodiment variant shown in FIG. 4, the functions or function blocks 38, 40 and 42 are also in connection with operating state coordinator 46 via a direct access 48, operating state coordinator 46 also being in bidirectional data exchange 56 with scheduler 50 (DSM). The individual functions or function blocks 38, 40, 42 are also in connection with stop release 52 of internal combustion engine 18. The internal combustion engine sends a signal CO Eng_stop ENA to start/stop coordinator 54.

What is claimed is:

1. A method for setting an operating state of an internal combustion engine of a hybrid drive system, the hybrid drive system further including at least one electric drive, a hybrid coordinator, a control unit for the internal combustion engine, the control unit including multiple functions, the method comprising:

generating and transmitting, by each function, information regarding operating readiness of the respective function and associated possible operating states of the internal combustion engine in which the respective function is able to be executed;

selecting, by a scheduler of the functions, a function which has operating readiness and has the highest priority among the multiple functions; and if at least one of the possible operating states associated with the selected function is able to be implemented by the hybrid coordinator, the hybrid coordinator performing a modification of a distribution of power between the internal combustion engine and the at least one electric drive to operate the internal combustion engine at the at least one of the possible operating states.

2. The method as recited in claim 1, wherein during the modification of the distribution of power between the internal combustion engine and the at least one electric drive, a requested transmission output torque is generated and a requested vehicle speed is maintained.

3. The method as recited in claim 1, wherein each of the functions sends its operating readiness to the scheduler via a signal at each specific possible operating point or operating range.

4. A method for setting an operating state of an internal combustion engine of a hybrid drive system, the hybrid drive system further including at least one electric drive, a hybrid coordinator, a control unit for the internal combustion engine, the control unit including multiple functions, the method comprising:

generating and transmitting, by the hybrid coordinator, information regarding possible operating states or operating ranges of the internal combustion engine to the control unit of the internal combustion engine or a scheduler of the functions;

determining, by each of the functions or by the scheduler of the functions, operating readiness of each function for the possible operating states or the possible operating ranges of the internal combustion engine;

selecting, by the scheduler of the functions, a function which has operating readiness and has the highest priority among the multiple functions, wherein the scheduler sends at least one of possible operating state and possible operating range associated with the selected function to the hybrid coordinator; and performing, by the hybrid coordinator, a modification of a distribution of power between the internal combustion engine and the at least one electric drive to operate the internal combustion engine at the at least one of the possible operating state and the possible operating range associated with the selected function.

5. The method as recited in claim 4, wherein a maximum time duration for at least one of an operating state and an operating range, of the internal combustion engine is determined in the hybrid coordinator, the maximum time duration being sent either to the control unit for the internal combustion engine or to the scheduler of the functions.

6. The method as recited in claim 4, wherein in the event of a modification of the driving state, the hybrid coordinator adjusts the possible operating states of the internal combustion engine, and a change occurs between at least one of various operating states, thrust, idling, normal operation, engine stop, and operating points of the internal combustion engine, without changing the transmission output torque and without changing a transmission output rotational speed.

* * * * *